(12) United States Patent
Chechi

(10) Patent No.: US 11,499,481 B2
(45) Date of Patent: Nov. 15, 2022

(54) FUEL DISTRIBUTION DEVICE, GAS TURBINE ENGINE AND MOUNTING METHOD

(71) Applicant: Nuovo Pignone Tecnologie S.R.L., Florence (IT)

(72) Inventor: Simone Chechi, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 572 days.

(21) Appl. No.: 15/323,125

(22) PCT Filed: Jul. 1, 2015

(86) PCT No.: PCT/EP2015/064981
§ 371 (c)(1),
(2) Date: Dec. 30, 2016

(87) PCT Pub. No.: WO2016/001301
PCT Pub. Date: Jan. 7, 2016

(65) Prior Publication Data
US 2018/0195438 A1  Jul. 12, 2018

(30) Foreign Application Priority Data

Jul. 2, 2014 (IT) .......................... CO2014A000022

(51) Int. Cl.
*F02C 7/22* (2006.01)
*F23K 5/06* (2006.01)
(Continued)

(52) U.S. Cl.
CPC .............. *F02C 7/222* (2013.01); *F02C 7/228* (2013.01); *F23K 5/06* (2013.01); *F23R 3/283* (2013.01);
(Continued)

(58) Field of Classification Search
CPC .. F02C 7/22; F02C 7/222; F02C 7/228; F23K 5/06; F23K 5/005; F23R 3/28; F23R 3/34
See application file for complete search history.

(56) References Cited

U.S. PATENT DOCUMENTS 2,664,910 A    1/1954  Winnett
3,908,933 A *  9/1975  Goss .......................... F23R 3/60
                                                            244/3.21
(Continued)

FOREIGN PATENT DOCUMENTS

CN    101713546 A    5/2010
EP     1906091 A2    4/2008
(Continued)

OTHER PUBLICATIONS

International Search Report and Written Opinion issued in connection with corresponding WO Application No. PCT/EP2015/064981 dated Jul. 31, 2015.
(Continued)

*Primary Examiner* — Todd E Manahan
*Assistant Examiner* — Rodolphe Andre Chabreyrie
(74) *Attorney, Agent, or Firm* — Baker Hughes Patent Org; Marc Vivenzio

(57) ABSTRACT

A fuel distribution device is provided wherein an axis is defined. The device comprises a body housing a distribution path for fuel; the distribution path has one inlet and a plurality of outlets; the inlet is located on the external surface of the body at an end of an inlet branch of the distribution path; the plurality of outlets are located on the external surface of the body at ends of a corresponding plurality of outlet branches of the distribution path; the inlet branch and the outlet branches are fluidly connected to a distribution space; and the outlet branches are arranged radially.

10 Claims, 7 Drawing Sheets

(51) Int. Cl.
    *F02C 7/228* (2006.01)
    *F23R 3/28* (2006.01)
(52) U.S. Cl.
    CPC ...... *F05D 2220/32* (2013.01); *F05D 2230/60* (2013.01); *F05D 2240/35* (2013.01); *F05D 2240/40* (2013.01); *F05D 2250/51* (2013.01); *F05D 2250/52* (2013.01); *F05D 2250/72* (2013.01)

(56) References Cited

U.S. PATENT DOCUMENTS

| | | | | |
|---|---|---|---|---|
| 4,226,365 | A * | 10/1980 | Norris | F02C 9/263 |
| | | | | 137/118.01 |
| 4,546,796 | A | 10/1985 | Bourquin | |
| 5,235,814 | A | 8/1993 | Leonard | |
| 5,339,635 | A | 8/1994 | Iwai et al. | |
| 5,628,184 | A * | 5/1997 | Santos | F02C 3/22 |
| | | | | 60/39.281 |
| 5,657,632 | A | 8/1997 | Foss | |
| 5,974,780 | A | 11/1999 | Santos | |
| 6,038,861 | A | 3/2000 | Amos et al. | |
| 6,598,383 | B1 | 7/2003 | Vandervort et al. | |
| 7,000,403 | B2 | 2/2006 | Henriquez et al. | |
| 8,196,408 | B2 | 6/2012 | Khosla et al. | |
| 8,316,875 | B2 | 11/2012 | Erickson et al. | |
| 8,469,059 | B1 | 6/2013 | Forst | |
| 2003/0217556 | A1 | 11/2003 | Wiebe | |
| 2005/0022530 | A1 | 2/2005 | Belsom | |
| 2006/0080966 | A1 | 4/2006 | Widener | |
| 2009/0158743 | A1 | 6/2009 | Francis | |
| 2010/0139279 | A1 | 6/2010 | Reed et al. | |
| 2012/0031102 | A1 | 2/2012 | Uhm et al. | |
| 2012/0305086 | A1 | 12/2012 | Zhang et al. | |
| 2013/0104554 | A1 | 5/2013 | Bode et al. | |
| 2013/0167954 | A1 * | 7/2013 | Bailey | F02C 7/222 |
| | | | | 137/561 A |
| 2013/0213051 | A1 | 8/2013 | Westmoreland, III et al. | |
| 2013/0232979 | A1 | 9/2013 | Singh | |
| 2013/0340438 | A1 * | 12/2013 | Abreu | F02C 7/222 |
| | | | | 60/772 |
| 2015/0176496 | A1 * | 6/2015 | Zordan | F02C 7/222 |
| | | | | 60/739 |
| 2016/0377293 | A1 * | 12/2016 | Short | F23R 3/283 |
| | | | | 60/738 |

FOREIGN PATENT DOCUMENTS

| | | |
|---|---|---|
| EP | 2 613 039 A2 | 7/2013 |
| EP | 2 741 005 A1 | 6/2014 |
| JP | H0710143 Y2 | 3/1995 |
| JP | H08159474 U | 6/1996 |
| JP | 2002519617 A | 7/2002 |
| JP | 2005054789 A | 3/2005 |
| JP | 2008025910 A | 2/2008 |
| JP | 2008082333 A | 4/2008 |
| JP | 2013139805 A | 7/2013 |
| JP | 2013170813 A | 9/2013 |
| JP | 2013190201 A | 9/2013 |
| WO | 0000770 A1 | 1/2000 |

OTHER PUBLICATIONS

International Preliminary Report on Patentability issued in connection with corresponding WO Application No. PCT/EP2015/064981 dated Jan. 3, 2017.

* cited by examiner

FUEL DISTRIBUTION DEVICE, GAS TURBINE ENGINE AND MOUNTING METHOD

BACKGROUND

Embodiments of the subject matter disclosed herein relate to a fuel distribution device, a gas turbine engine with fuel distribution devices and a method of mounting a fuel distribution device.

Gas turbine engines comprise one or more combustion chambers.

In general, gas turbine engines comprise one or more fuel distribution devices, each of them being designed to feed through corresponding tubes a plurality of fuel cartridges; often, a set of fuel cartridges are mounted on a cover plate of a combustion chamber (i.e. an element capping a back end of a combustion chamber) and a fuel distribution device is associated to the cover plate. This leads to a tangle of tubes that are difficult to be installed and replaced (in case of need). The situation is even worse when there are a fuel main circuit and a fuel pilot circuit separated from each other. The smaller the engine the more difficult it is to fit all the necessary tubes.

BRIEF DESCRIPTION

Therefore, there is a need for a solution that allows an easy installation and replacement of tubes connecting a fuel distribution device to a plurality of fuel cartridges.

Additionally, the fuel distribution device should be compact.

The fuel distribution device should be able to distribute fuel to a fuel main circuit and a fuel pilot circuit separated from each other.

A first aspect of the present invention is a fuel distribution device.

In general, the fuel distribution device has an axis and comprises a body housing a distribution path for fuel, wherein the distribution path has one inlet and a plurality of outlets; the inlet is located on the external surface of the body at an end of an inlet branch of the distribution path; the plurality of outlets are located on the external surface of the body at ends of a corresponding plurality of outlet branches of the distribution path; the inlet branch and the outlet branches are fluidly connected to a distribution space; and the outlet branches are arranged radially.

A second aspect of the present invention is a gas turbine engine.

In general, the gas turbine engine comprises one or more fuel distribution devices as generally set out above.

A third aspect of the present invention is a mounting method.

In general, the method of mounting a fuel distribution device to a cover plate of a combustion chamber, wherein the fuel distribution device has a device axis and the cover plate has a plate axis and several receiving elements, comprises the following steps: a plurality of fuel tubes are mounted to the fuel distribution device so that free ends of the fuel tubes are arranged axially and aligned with the receiving elements of the cover plate; the fuel distribution device is aligned to the cover plate so that the device axis and the plate axis coincide; the fuel distribution device is translated toward the cover plate according to an axial direction; and the free ends of the fuel tubes are fixed to the cover plate.

BRIEF DESCRIPTION OF DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION

Figure 1:
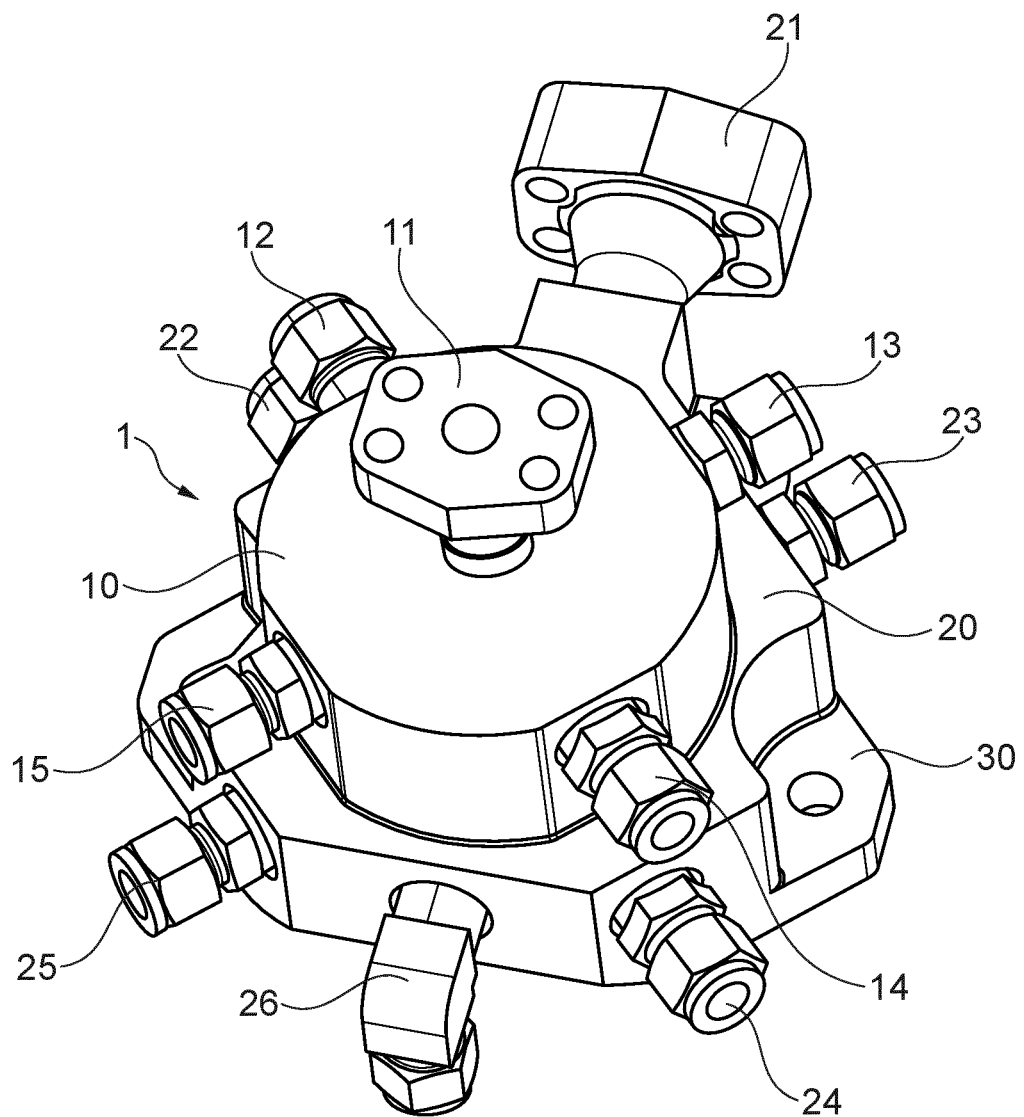
FIG. 1 shows a perspective view of an embodiment of a fuel distribution device according to an embodiment of the present invention.
Figure 2:
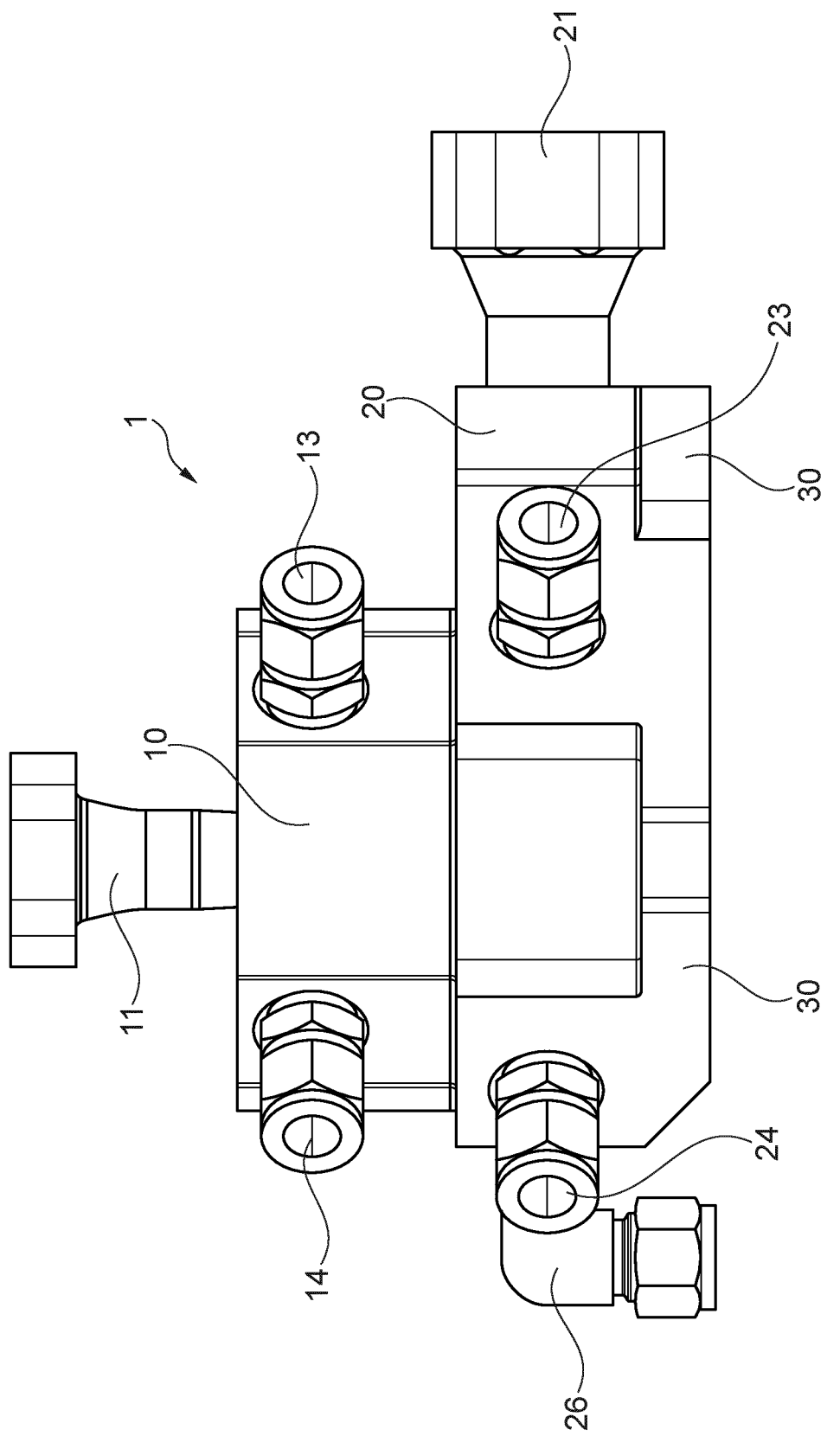
FIG. 2 shows a lateral view of the device of FIG. 1.
Figure 3:
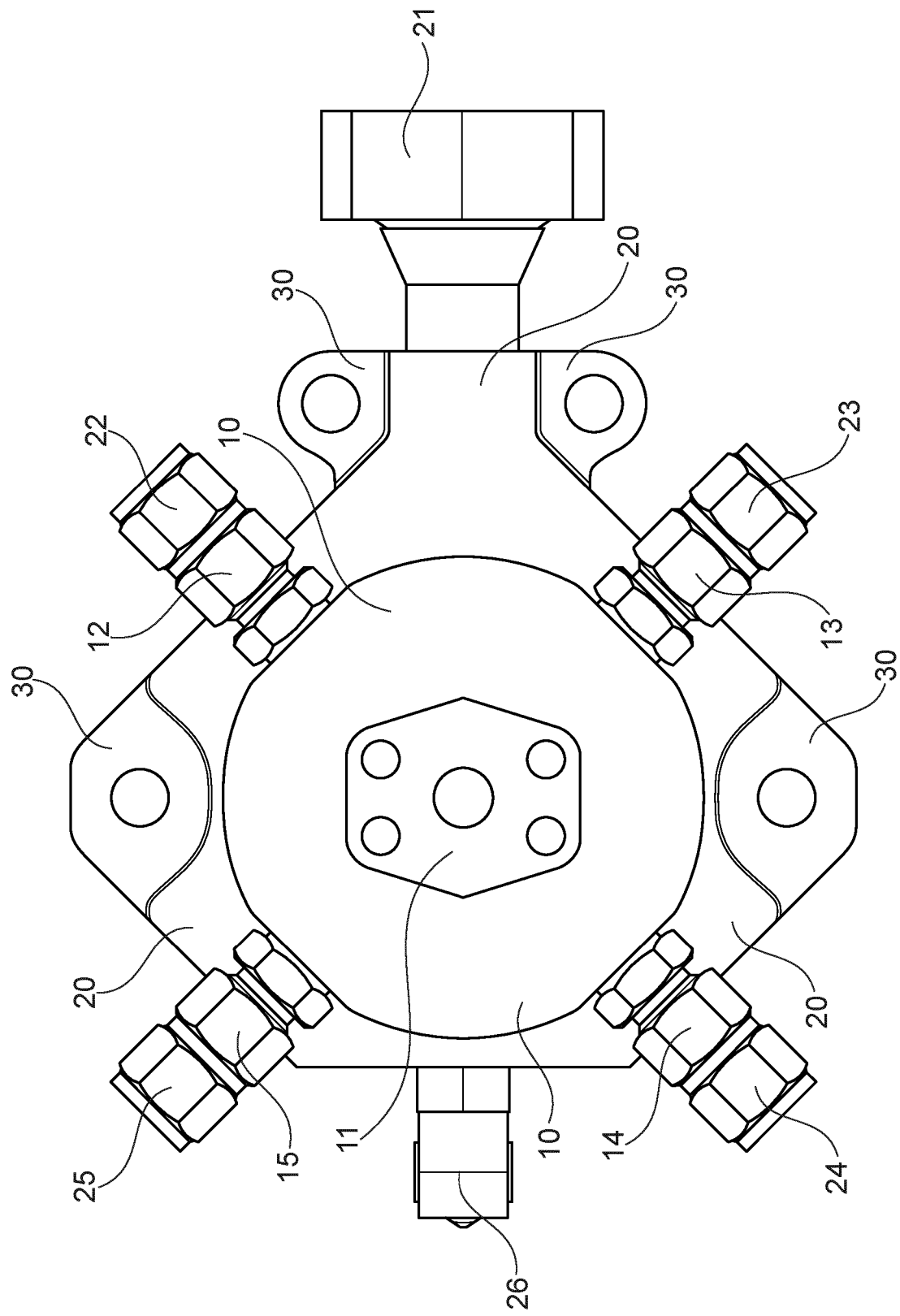
FIG. 3 shows a top view of the device of FIG. 1.

The following description of exemplary embodiments refers to the accompanying drawings.

The following description does not limit the present invention. Instead, the scope of the present invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The fuel distribution device 1 of the embodiment shown in the figures, comprises: a first body 10 housing a first distribution path for fuel (in particular the fuel of a pilot supply of a combustion chamber of a gas turbine engine); a second body 20 housing a second distribution path for fuel (in particular the fuel of a main supply of a combustion chamber of a gas turbine engine); and a fixing plate 30.

Alternative embodiments may comprise a different number of bodies, from a minimum of e.g. one to a maximum of e.g. four.

In this embodiment, the plate 30 and the body 20 and the body 10 form a single piece. Alternative embodiments may have different constructions, for example, there may be two or three distinct pieces for example adjacent and joined together e.g. by welding.

In the device 1 an axis is defined that is perpendicular to the plate 30 and is central to one or both of the two bodies, in particular of the body 10 (more in particular, the axis of its inlet 11 and its inlet branch 17 and its distribution space 100); the axis is central also to the body 20 in particular if its internal structure is considered (for example its distribution space 200). Therefore in this embodiment, the first body 10 and the second body 20 and, to a certain extent, the fixing plate 30 are axially aligned.

Figure 4:
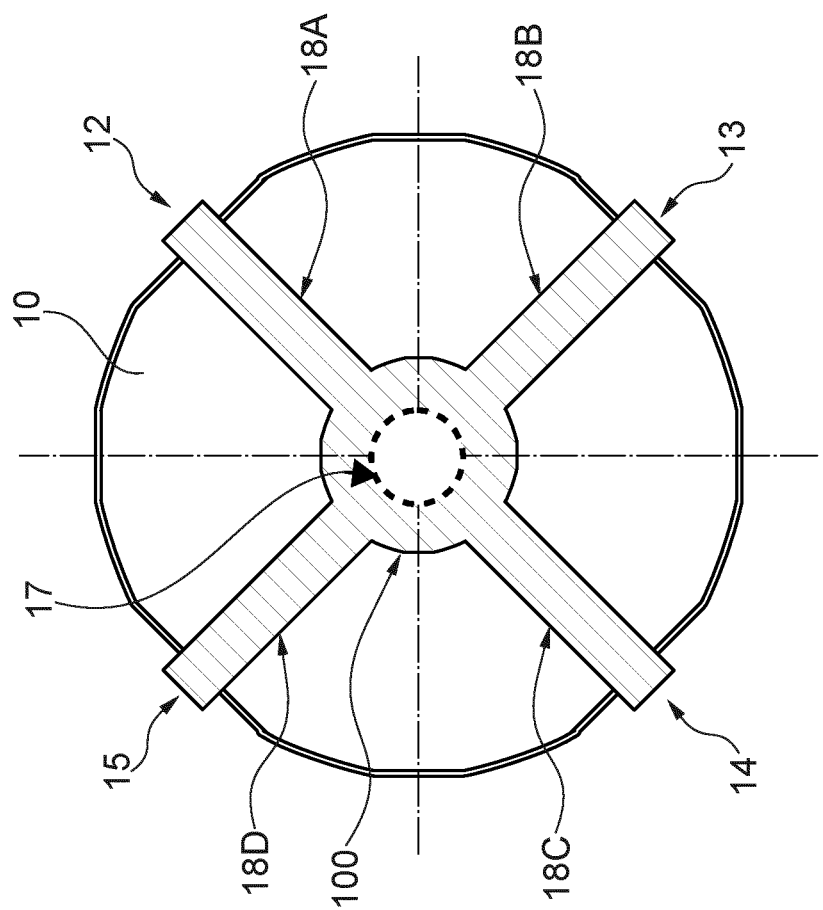
FIG. 4 shows a first transversal cross-section view of the device of FIG. 1.

The first distribution path has one inlet 11, in particular having a connection flange, and a plurality of outlets 12, 13, 14, 15 (in this embodiment four outlets), in particular having connection nuts. The inlet and the outlets are conceptually on external surface of the body 10; anyway, in this embodiment, there are elements prolonging them beyond this surface (this is particularly evident for the inlet 11). The inlet 11 is located at an end of an inlet branch 17 (FIG. 4 contains the transversal cross-section of the inlet branch 17, schematically shown as a white circumference in dashed line, as it is perpendicular to the plane of FIG. 4) of the distribution path; the plurality of outlets 12, 13, 14, 15 are located at ends of a corresponding plurality of outlet branches 18A, 18B, 18C, 18D (see FIG. 4) of the distribution path. The inlet branch 17 and the outlet branches 18A, 18B, 18C, 18D are fluidly connected to a distribution space 100 (see FIG. 4).

Figure 5:
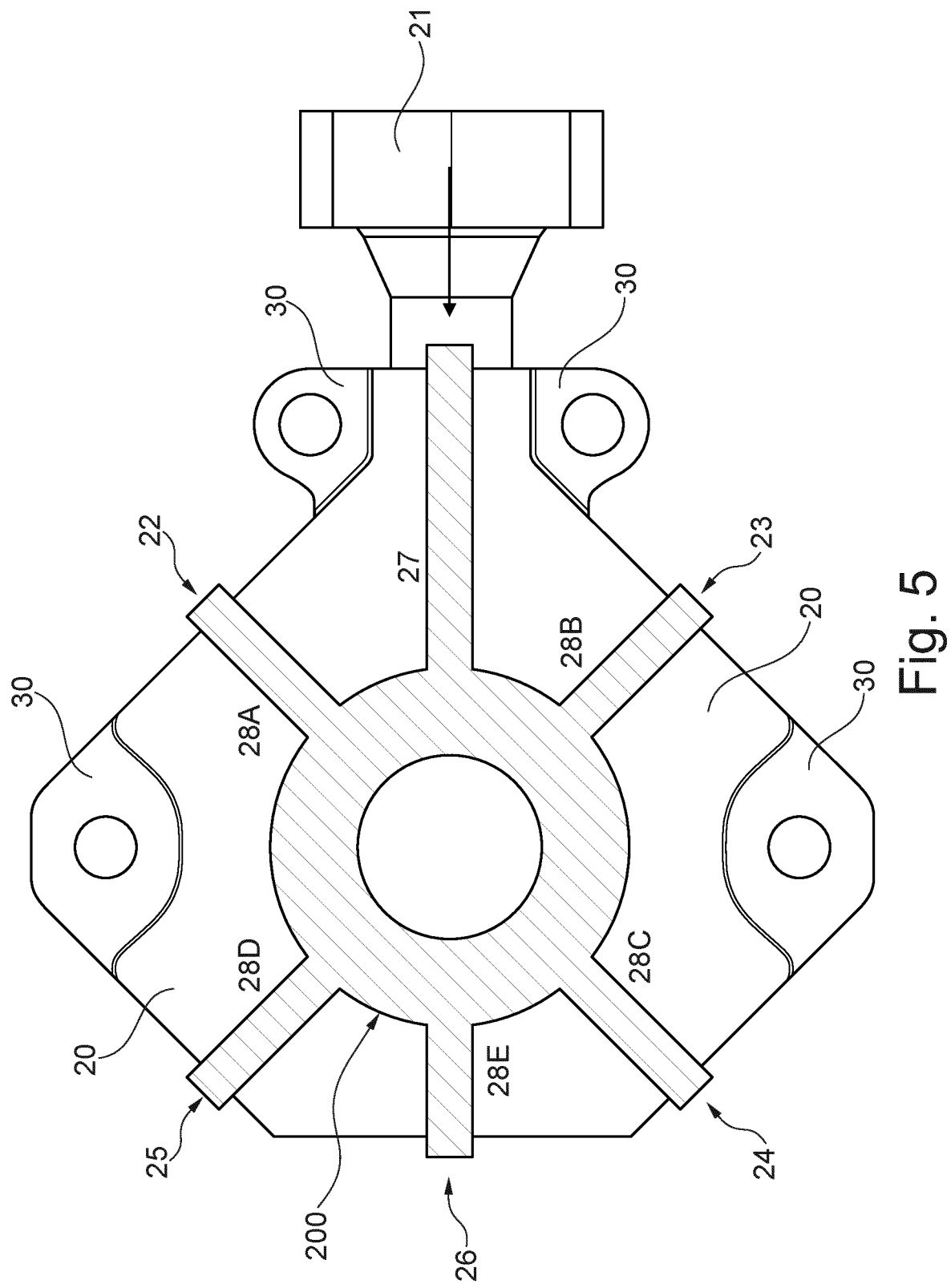
FIG. 5 shows a second transversal cross-section view of the device of FIG. 1.

The second distribution path has one inlet 21, in particular having a connection flange, and a plurality of outlets 22, 23, 24, 25, 26 (in this embodiment five outlets), in particular having connection nuts. The inlet and the outlets are conceptually on external surface of the body 20; anyway, in this embodiment, there are elements prolonging them beyond this surface (this is particularly evident for the inlet 21). The inlet 21 is located at an end of an inlet branch 27 (see FIG. 5) of the distribution path; the plurality of outlets 22, 23, 24, 25, 26 (see FIG. 5) are located at ends of a corresponding plurality of outlet branches 28A, 28B, 28C, 28D, 28E of the distribution path. The inlet branch 27 and the outlet branches 28A, 28B, 28C, 28D, 28E are fluidly connected to a distribution space 200 (see FIG. 5).

It is to be noted that, in the embodiment of the figures, there are five fuel cartridges; all of them have a main circuit fuel inlet, but only four of them have a pilot circuit fuel inlet; outlet 26 is for the central fuel cartridge associated to the main circuit. Therefore, in general, the number of outlets of a first body of the distribution device may be different from the number of outlets of a second body of the distribution device.

The first distribution path (combination of elements 17, 18A, 18B, 18C, 18D, 100) and the second distribution path (combination of elements 27, 28A, 28B, 28C, 28D, 28E, 200) are separated, i.e. they are not in communication between each other.

Considering the first distribution path, the inlet branch 17 is arranged axially, the outlet branches 18A, 18B, 18C, 18D are arranged radially, and the distribution space 100 is cylindrical cavity (its diameter may be small, medium or large).

Considering the second distribution path, the inlet branch 27 is arranged radially, the outlet branches 28A, 28B, 28C, 28D, 28E are arranged radially, and the distribution space 200 is a ring conduit.

According to a first alternative embodiment, the inlet branches of both bodies 10 and 20 may be axial and coaxial.

According to a second alternative embodiment, the inlet branches of both bodies 10 and 20 may be axial and parallel; in this case the inlet branch of the body 20 pass though the body 10 without communication with the distribution path of the body 10.

The plate 30 has a plurality of connection holes (in this embodiment four holes) for receiving a corresponding plurality of bolts.

Figure 7:
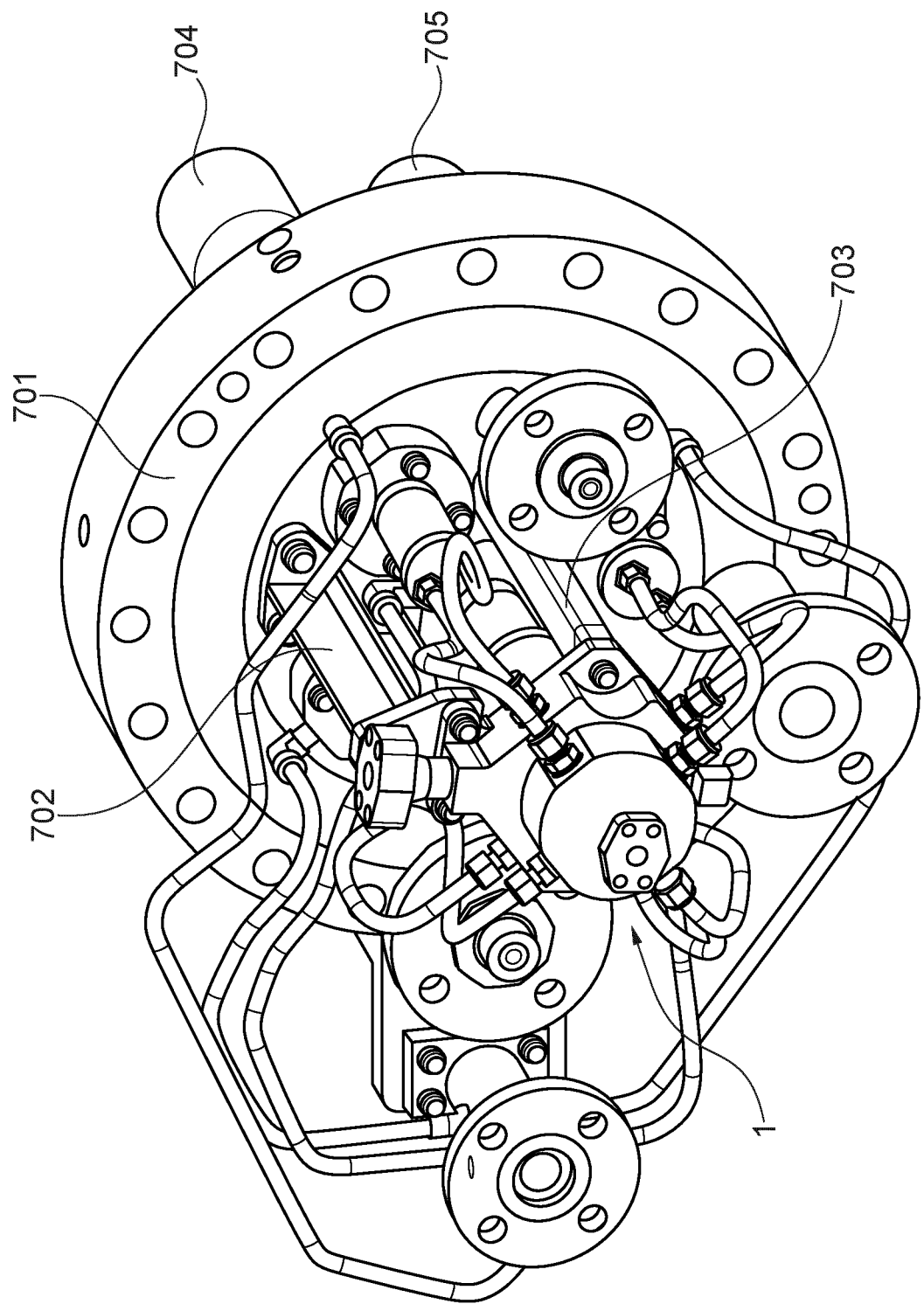
FIG. 7 shows a perspective view of the device of FIG. 1 mounted to a cover plate of a combustion chamber of a gas turbine engine.

FIG. 7 shows an end cover plate 701 of a combustion chamber of a gas turbine engine; this figure shows also a couple of fuel nozzles 704 and 705 associated and coaxial to corresponding fuel cartridges mounted to the end cover plate 701 respectively on its internal and external sides; it is worth remembering that the cover plate serves for capping a back end of a combustion chamber. The fuel distribution device 1 is designed to feed (through tubes) the external fuel cartridges associated and coaxial to the internal fuel nozzles 704 and 705 (and other three cartridges and associated nozzles are not shown in the figure) of the combustion chamber and is mounted one the end cover plate 701. The fuel distribution device 1 is mounted on the end cover plate 701 through one or two or three or four or five or more mounting columns; in particular, the fixing plate 30 is mounted on the end cover plate 701 through three columns (even if the fixing plate has four connection holes, as two holes are used for one column); only a first column 702 and a second column 703 are shown in FIG. 7.

Typically, there is more than one fuel distribution devices in a gas turbine engine; often, there is a fuel distribution device for each combustion chamber of a gas turbine engine.

Figure 6:
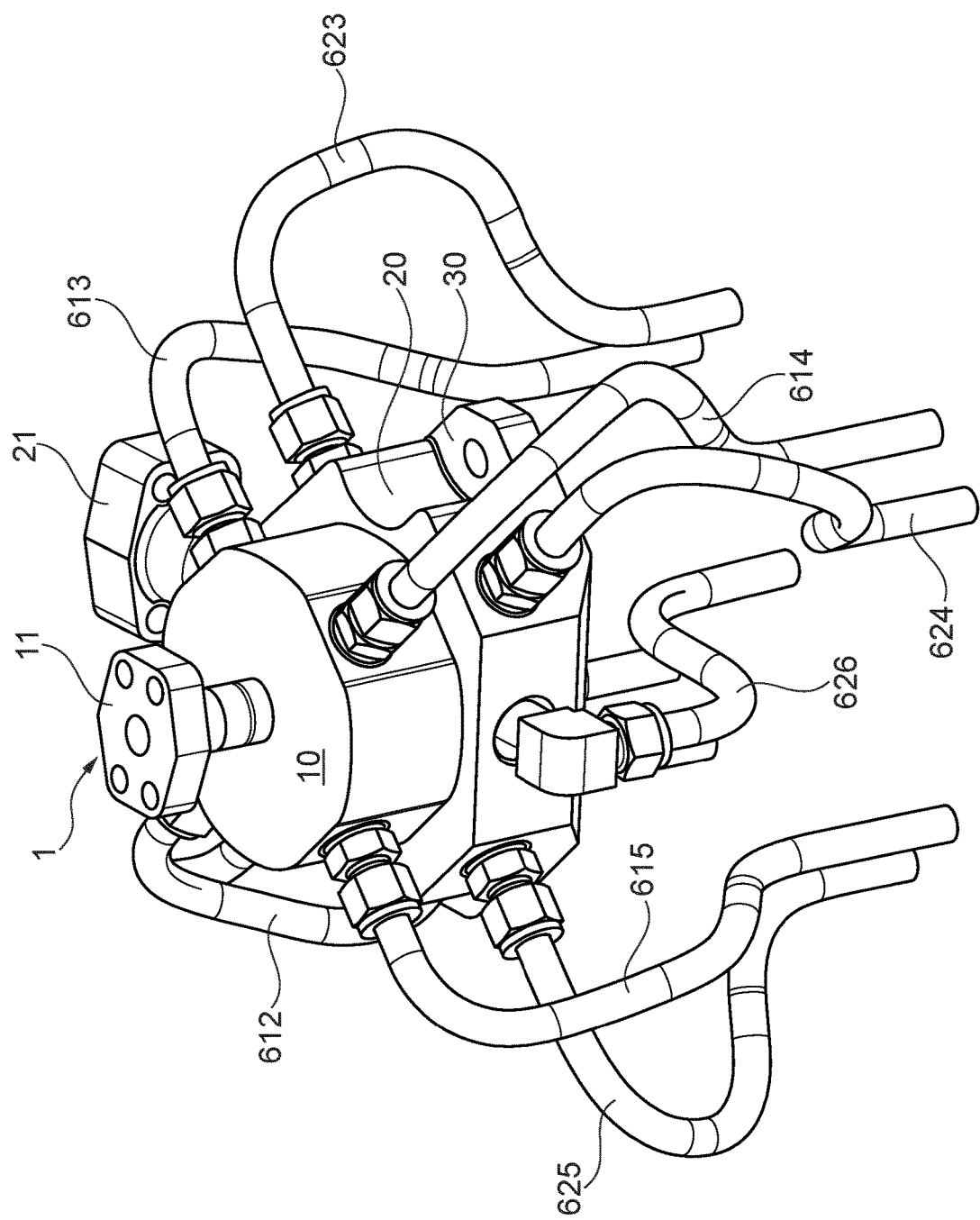
FIG. 6 shows a perspective view of the device of FIG. 1 with a set of fuel tubes mounted thereto.

FIG. 6 shows the fuel distribution device 1 with a set of tubes to feed fuel; such fuel tubes are usually made of metal material; tube 612 is fluidly connected to outlet 12, tube 613 is fluidly connected to outlet 13, tube 614 is fluidly connected to outlet 14, tube 615 is fluidly connected to outlet 15, tube 622 is fluidly connected to outlet 22, tube 623 is fluidly connected to outlet 23, tube 624 is fluidly connected to outlet 24, tube 625 is fluidly connected to outlet 25, tube 626 is fluidly connected to outlet 26. Such set of tubes may seem a tangle of tubes, but it is indeed very orderly and facilitates installation of the tubes and replacement of the tubes (in case of need). It is to be noted that the free ends of tubes 612-626 are parallel to each other and to the axis of the fuel distribution device 1.

As it is apparent from FIG. 6, both the distribution device 1 and the end cover plate 701 have an own axis.

The cover plate 701 comprises a plurality of receiving elements configured to receive the free ends of the fuel tubes.

The mounting of the fuel distribution device 1 to the cover plate 701 may occur as follows: a plurality of fuel tubes are mounted to the fuel distribution device so that free ends of the fuel tubes are arranged axially and aligned with the receiving elements of the cover plate; the fuel distribution device is aligned to the end cover plate so that the device axis and the plate axis coincide; the fuel distribution device is translated toward the end cover plate according to an axial direction; and the free ends of the fuel tubes are fixed to the end cover plate.

In order to complete mounting the fixing plate 30 of the device 1 is fixed to the end cover plate 701 by means of mounting columns (see for example columns 702 and 703 in FIG. 7)

In this way, basically, the tubes do not need to be bent during mounting.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:
1. A fuel distribution device comprising:
    a defined axis;
    a first body housing a first distribution path providing a
        pilot fuel supply to a combustion chamber coupled to the fuel distribution device, wherein the first distribution path has a first inlet and a first plurality of outlets;
a second body housing a second distribution path providing a main fuel supply to the combustion chamber, wherein the second distribution path has a second inlet and a second plurality of outlets; and
a fixing plate, wherein a plane of the fixing plate is perpendicular to the defined axis;
wherein the first inlet and the second inlet are respectively located on external surfaces of the first body housing and the second body housing, the first inlet located at a first end of a first inlet branch of the first distribution path and the second inlet located at a second end of a second inlet branch of the second distribution path;
wherein the first plurality of outlets and the second plurality of outlets are respectively located on external surfaces of the first body housing and the second body housing, the first plurality of outlets located at first ends of a corresponding first plurality of outlet branches of the first distribution path and the second plurality of outlets located at second ends of a corresponding second plurality of outlet branches of the second distribution path;
wherein the first inlet branch and the first plurality of outlet branches are fluidly connected to a first distribution space, and the second inlet branch and the second plurality of outlet branches are fluidly connected to a second distribution space, the first distribution space separate from the second distribution space;
wherein the first body, the second body and the fixing plate are axially aligned relative to each other with respect to the defined axis and are stacked such that the second body lies between the first body and the fixing plate; and
wherein the first plurality of outlet branches and the second plurality of outlet branches are arranged radially with respect to the first distribution space and the second distribution space.

2. The fuel distribution device of claim 1, wherein the first inlet branch and the second inlet branch are arranged radially with respect to the first distribution space and the second distribution space.

3. The fuel distribution device of claim 1, wherein the first distribution space includes a first ring conduit and the second distribution space includes a second ring conduit.

4. The fuel distribution device of claim 1, wherein the first inlet branch is arranged axially.

5. The fuel distribution device of claim 4, wherein the first inlet branch is arranged axially with respect to the first distribution space.

6. The fuel distribution device of claim 1, wherein the first distribution space includes a first cylindrical cavity and the second distribution space includes a second cylindrical cavity.

7. The fuel distribution device of claim 1, wherein the first body housing, the second body housing, and the fixing plate are axially aligned.

8. The fuel distribution device of claim 7, wherein:
the first plurality of outlet branches are arranged axially with respect to the first distribution space; and
the second plurality of outlet branches are arranged axially with respect to the second distribution space.

9. A gas turbine engine comprising one or more fuel distribution devices, the fuel distribution device comprising:
a defined axis;
a first body housing a first distribution path providing a pilot fuel supply to a combustion chamber of the gas turbine engine, the combustion chamber coupled to the fuel distribution device, wherein the first distribution path has a first inlet and a first plurality of outlets;
a second body housing a second distribution path providing a main fuel supply to the combustion chamber, wherein the second distribution path has a second inlet and a second plurality of outlets; and
a fixing plate, wherein a plane of the fixing plate is perpendicular to the defined axis;
wherein the first inlet and the second inlet are respectively located on external surfaces of the first body housing and the second body housing, the first inlet located at a first end of a first inlet branch of the first distribution path and the second inlet located at a second end of a second inlet branch of the second distribution path;
wherein the first plurality of outlets and the second plurality of outlets are respectively located on external surfaces of the first body housing and the second body housing, the first plurality of outlets located at first ends of a corresponding first plurality of outlet branches of the first distribution path and the second plurality of outlets located at second ends of a corresponding second plurality of outlet branches of the second distribution path;
wherein the first inlet branch and the first plurality of outlet branches are fluidly connected to a first distribution space, and the second inlet branch and the second plurality of outlet branches are fluidically connected to a second distribution space, the first distribution space separate from the second distribution space;
wherein the first body the second body and the fixing plate are axially aligned relative to each other with respect to the defined axis and are stacked such that the second body lies between the first body and the fixing plate; and
wherein the first plurality of outlet branches and the second plurality of outlet branches are arranged radially with respect to the first distribution space and the second distribution space.

10. The gas turbine engine of claim 9, wherein the combustion chamber includes an end cover plate, wherein said fuel distribution device is mounted on said end cover plate through one or two or three or four or five or more mounting columns.

* * * * *